US012783310B2

(12) United States Patent
Jindal et al.

(10) Patent No.: US 12,783,310 B2
(45) Date of Patent: Nov. 3, 2026

(54) USING HASH BASED MECHANISM TO DISCOVER CALLER PATH IN A MICRO-SERVICE GRAPH

(71) Applicant: Uber Technologies, Inc., San Francisco, CA (US)

(72) Inventors: Shivam Jindal, San Francisco, CA (US); Deepanshu Mehndiratta, Bangalore (IN); Alok Srivastava, Bangalore (IN); Ankit Srivastava, Redwood City, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 478 days.

(21) Appl. No.: 18/480,961

(22) Filed: Oct. 4, 2023

(65) Prior Publication Data

US 2025/0117255 A1 Apr. 10, 2025

(51) Int. Cl.
*G06F 9/50* (2006.01)

(52) U.S. Cl.
CPC .................................. *G06F 9/5027* (2013.01)

(58) Field of Classification Search
CPC .. G06F 9/45558; G06F 9/547; G06F 11/3636; G06F 2009/45591; G06F 2009/45595
See application file for complete search history.

(56) References Cited

U.S. PATENT DOCUMENTS 11,921,618 B2 * 3/2024 Li ........................ G06F 11/3636
11,966,323 B2 * 4/2024 Masis ................... G06F 11/079

OTHER PUBLICATIONS

Collet, Yann. (2023). "Collision Ratio Comparison." GitHub. https://github.com/Cyan4973/xxHash/wiki/Collision-ratio-comparison Retrieved on Oct. 4, 2023. 5 pages.
Collet, Yann. (2023). "Performance Comparison." GitHub. https://github.com/Cyan4973/xxHash/wiki/Performance-comparison Retrieved on Oct. 4, 2023. 8 pages.
Jabgar, "Jaeger: open source, distributed tracing platform", https://www.jaegertracing.io/, retrieved on Oct. 4, 2023. 9 pages.
Matsuoka, et al. "xxHash." GitHub. https://xxhash.com/ retrieved Oct. 4, 2023. 9 pages.

* cited by examiner

*Primary Examiner* — Andy Ho
(74) *Attorney, Agent, or Firm* — Dority & Manning, P.A.

(57) ABSTRACT

Systems and methods for discovering caller paths in a micro-service graph are disclosed. The system can receive a first request to interact with a first node, wherein the first node is associated with a software application. The system can generate a first bit encoding indicative of the first node. The system can transmit, from the first node, a second request to a second node associated with the software application, wherein the second request is associated with the first request. The system can generate, based on the first bit encoding, a second bit encoding indicative of the first node and the second node. The system can determine, based on the second bit encoding, a sequence of requests.

20 Claims, 7 Drawing Sheets

USING HASH BASED MECHANISM TO DISCOVER CALLER PATH IN A MICRO-SERVICE GRAPH

FIELD

The present disclosure generally relates to techniques for determining interactions between a plurality of computing processes.

BACKGROUND

A request for data may invoke a plurality of nested, asynchronous, or downstream computing operations within a computing system to generate a result. The result of complex interactions between numerous computing operations may increase difficulty in identifying issues or inefficiencies among the computing operations within the computing system.

SUMMARY

Aspects and advantages of embodiments of the present disclosure will be set forth in part in the following description, or may be learned from the description, or may be learned through practice of the embodiments.

In an example aspect, present disclosure provides an example computing system. The example computing system includes one or more processors and one or more non-transitory, computer readable medium storing instructions that are executable by the one or more processors to cause the computing system to perform operations. The example operations include receiving a first request to interact with first node, wherein the first node is associated with a software application. The example operations include generating a first bit encoding indicative of the first node. The example operations include transmitting, from the first node, a second request to a second node associated with the software application, wherein the second request is associated with the first request. The example operations include generating, based on the first bit encoding, a second bit encoding indicative of the first node and the second node. The example operations include determining, based on the second bit encoding, a sequence of requests.

In some examples, the first node is associated with a first microservice and the second node is associated with a second microservice.

In some examples, the operations include generating, based on the sequence of requests, a request chain, the request chain indicative of a transmission of requests across a plurality of nodes.

In some examples, the operations include updating the request chain, based on generating subsequent bit encodings.

In some examples, the operations include generating, based on the request chain, log data, wherein the log data describes a relationship between one or more nodes. In some examples, the operations include transmitting the log data to a storage system, the storage system storing a plurality of log data associated with one or more request chains.

In some examples, the log data comprises at least one of: (i) an error rate metric, (ii) a latency metric, or (iii) a request rate metric.

In some examples, the operations include outputting one or more command instructions to generate a user interface to display a caller mapping, the caller mapping indicative of the sequence of requests across a plurality of nodes.

In some examples, the operations include decoding the request chain, the request chain comprising the first bit encoding and the second bit encoding.

In some examples, the first bit encoding and the second bit encoding are generated using an algorithm, the algorithm configured to generate fixed-size bit encodings.

In some examples, the fixed sized bit encodings are a hash value.

In another aspect, the present disclosure provides an example computer-implemented method. The example computer-implemented method includes receiving a first request to interact with first node, wherein the first node is associated with a software application. The example computer-implemented method includes generating a first bit encoding indicative of the first node. The example computer-implemented method includes, transmitting, from the first node, a second request to a second node associated with the software application, wherein the second request is associated with the first request. The example computer-implemented method includes, generating, based on the first bit encoding, a second bit encoding indicative of the first node and the second node. The example computer-implemented method includes, determining, based on the second bit encoding, a sequence of requests.

In some examples, the first node is associated with a first microservice and the second node is associated with a second microservice.

In some examples, the method includes generating, based on the sequence of requests, a request chain, the request chain indicative of a transmission of requests across a plurality of nodes.

In some examples, the method includes updating the request chain, based on generating subsequent bit encodings.

In some examples, the example method includes generating, based on the request chain, log data, wherein the log data describes a relationship between one or more nodes. In some examples, the example method includes transmitting the log data to a storage system, the storage system storing a plurality of log data associated with one or more request chains.

In some examples, log data includes at least one of: (i) an error rate metric, (ii) a latency metric, or (iii) a request rate metric.

In some examples, the method includes outputting one or more command instructions to generate a user interface to display a caller mapping, the caller mapping indicative of the sequence of requests across a plurality of nodes.

In some examples, the method includes decoding the request chain, the request chain comprising the first bit encoding and the second bit encoding.

In some examples, the first bit encoding and the second bit encoding are generated using an algorithm, the algorithm configured to generate fixed-size bit encodings.

In another example aspect, the present disclosure provides for one or more example non-transitory computer-readable media storing instructions that are executable to cause one or more processors to perform operations. The example operations include receiving a first request to interact with first node, wherein the first node is associated with a software application. The example operations include generating a first bit encoding indicative of the first node. The example operations include transmitting, from the first node, a second request to a second node associated with the software application, wherein the second request is associated with the first request. The example operations include generating, based on the first bit encoding, a second bit encoding indicative of the first node and the second node. The example operations include determining, based on the second bit encoding, a sequence of requests.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
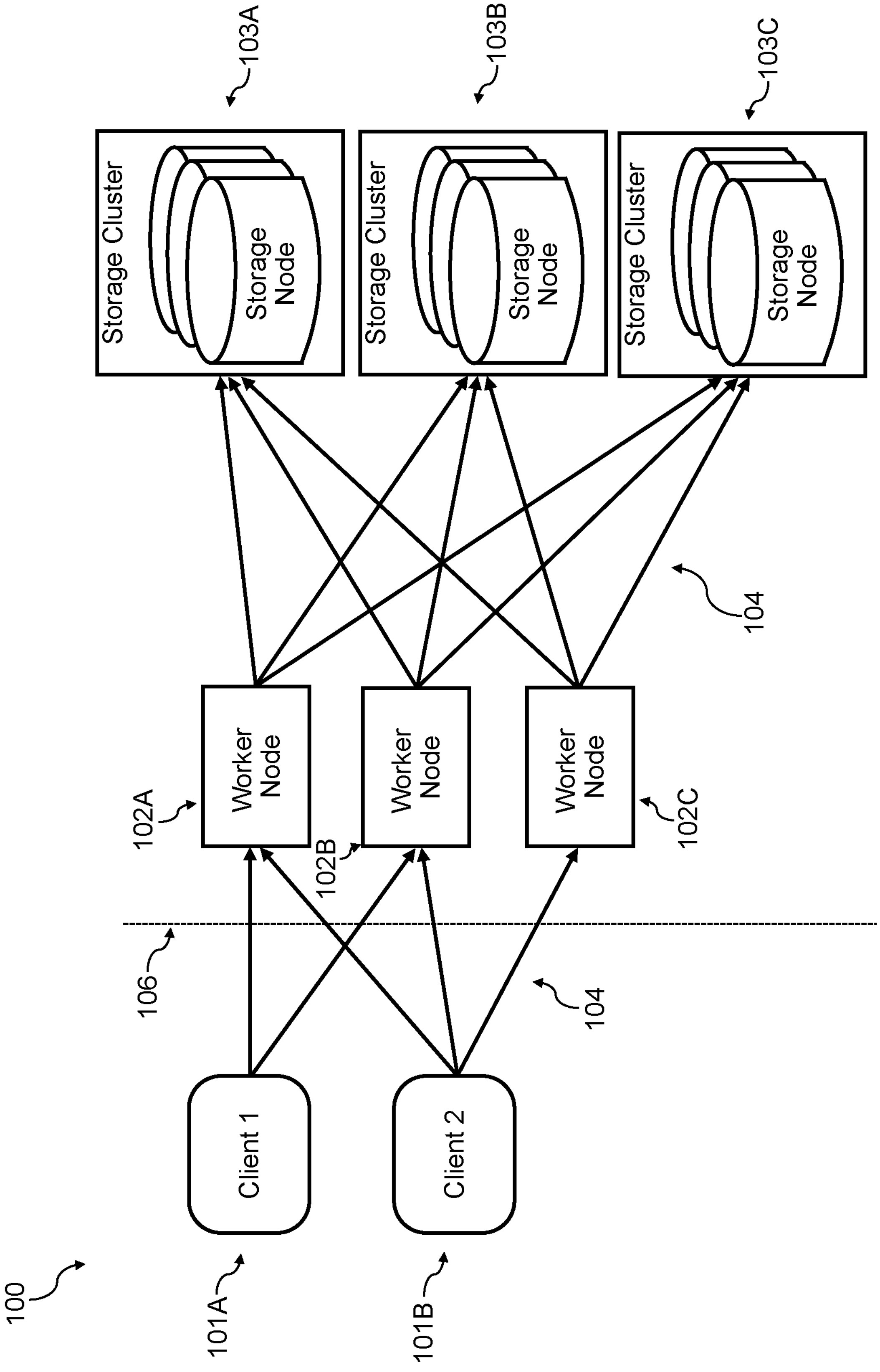
FIG. 1 depicts an example computing ecosystem according to example aspects of the present disclosure.

Generally, the present disclosure is directed to techniques for call tracing. Techniques according to the present disclosure provide improved API call tracing for an application using, for example, a caller propagation service that propagates encoded caller-chain information across respective call-paths and emits logs used to generate a mapping of the caller chain. The caller propagation service may receive a first request (e.g., API request) to interact with a first microservice running on a node. The caller propagation service may generate a hashed bit encoding indicating the first microservice. The first microservice may transmit a second request (e.g., API request) to a second microservice running on a second node. The caller propagation service may generate a second hashed bit encoding indicating the first microservice (e.g., the caller) and the second microservice (e.g., the path). The caller propagation service may emit metrics or logs indicating the caller path between the first microservice and the second microservice. The metrics or logs may be used, for example, to generate a mapping to trace API calls across a plurality of nodes.

For example, application clients may interact with an application system (e.g., backend servers) to retrieve or interact with data for the application. The application system may store data needed for the application client or computer process to execute properly. Example interactions between an application client and an application system may include reading, writing, updating, deleting, or storing operations that store, access, or interact with data in the application system.

The application system may include a plurality of nodes for facilitating requests from application clients. For example, the application system may include a plurality of microservices running on nodes within the application system. In some examples, the plurality of microservices may include modularized computing resources associated with specific processes for the application system. For instance, respective microservices may be associated with independent features or options available within the application client. In some examples, application clients may interact with a plurality of microservices during a single interaction. By way of example, a user may interact with an application client to retrieve a list of all available service options. In some examples, services may be architected into independent microservices. The application client may generate a request (e.g., query) and transmit the request via an API to an application server. The application server may forward the request to respective microservices associated with all available service options to retrieve a response (e.g., API response) to the user's request. In some examples, respective microservices may be called in a sequential order such that a path is created between the respective microservices. While examples herein describe an application system including a microservice architecture with a plurality of microservices, the application system may be any application backend architecture such as a monolithic architecture.

A caller propagation service may generate a hashed encoding indicating respect services in a sequential caller chain (e.g., caller path). A hashed encoding may include a unique fixed-length string (e.g., hash) which identifies the microservice caller (e.g., the transmitting service) and the microservice receiver (e.g., the receiving service). In some examples, the caller path may be identified based on the microservice caller and the microservice receiver. In some examples, the caller propagation service may generate a unique hashed encoding indicating respective microservices or caller paths. In some examples, the caller propagation service may update a hashed encoding to indicate a subsequent microservice or caller path called by the receiving service. In other examples, the caller propagation service may reuse hashed encodings indicating previously hashed microservices or caller paths.

The caller propagation service may emit metrics or logs indicating a sequence of requests across a plurality of microservices. For instance, the metrics or logs may include data indicating the microservice caller, the microservice receiver, the caller path, latency, error rate, request rate, or any other data relevant for API call tracing.

In some examples, the caller propagation service may emit metrics or logs to be consumed in real-time. By way of example, metrics or logs emitted by the caller-propagation service may be consumed by an operations microservice or remote computing system configured to implement rate limits on microservices to prevent performance issues. In some examples, metrics or logs emitted by the caller propagation service may be utilized to provide real-time root-cause analysis (RCA) for microservices experiencing an increased caller failure rate. In other examples, metrics or logs emitted by the caller propagation service may be stored in a storage system for processing. For instance, metrics or logs may be used to generate a user interface displaying a mapping of various caller chains across a plurality of nodes.

The technology of the present disclosure may provide several benefits and technical effects. For instance, the technology of the present disclosure provides real-time caller-chain inspection by emitting logs indicating the caller-path on each hop. As such, the technology may increase the efficiency of the application system by allowing microservices to enable rate limiting on varied paths or callers. The technology of the present disclosure may also help to increase the flexibility of application systems without impacting performance due to the hashed encodings which limit the size of the propagated caller path to preserve computing resources. Additionally, the limited size of the propagated caller paths may facilitate a reduced network-bandwidth. Moreover, by propagating caller paths on each hop, a more detailed request chain may be generated, allowing for increased visibility in call tracing. This helps detect conditions that impact computing efficiency (e.g., processing, resources, etc.) for the application system. As such, the technology of the present disclosure may improve the stability and reliability of application systems. Furthermore, the technology of the present disclosure overcomes variance in communication protocols within a microservices architecture. For instance, communication protocols utilized by one or more services within a microservices architecture may vary. The various communication protocols can include different file sizes. As such the technology may overcome this inefficiency by hashing the files communicated to each other to a standard length.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations may be made to the embodiments without departing from the scope of the present disclosure. For instance, features illustrated or described as part of one embodiment may be used with another embodiment to yield a still further embodiment. Thus, it is intended that aspects of the present disclosure cover such modifications and variations.

FIG. 1 depicts an example computing ecosystem according to example aspects of the present disclosure. The example system 100 may include one or more clients 101A-B, worker nodes 102A-C, and storage clusters 103A-C associated with the one or more worker nodes 102A-C. In some examples, the clients 101A-B may interact with the worker nodes 102A-C. For instance, the clients 101A-B may transmit queries 104 (e.g., API requests) through an API gateway 106 to interact with data stored in the storage clusters 103A-C. For example, the worker nodes 102A-C may receive the queries 104 from the API gateway 106 and facilitate the processing of the queries 104 by directing the query 104 to the correct storage clusters 103A-C for processing.

With respect to examples as described herein, the system 100 may be implemented on a server, on a combination of servers, or on a distributed set of computing devices which communicate over a network such as the Internet. For example, the system 100 may be distributed using one or more physical servers, virtual private servers, containers, cloud computing, etc. In some examples, the system 100 may be implemented as a part of or in connection with the clients 101A-B, where, for example, the clients 101A-B may be a mobile application client, web browsing client, or desktop application client deployed on a remote computing device that accesses one or more microservices of an application via a client-server relationship. A microservice may include one or more software applications architected into independent services (e.g., microservices) that communicate over APIs (application programming interfaces). The clients 101A-B may include computer hardware or software which access a service (e.g., microservice) for one or more applications or systems. For instance, the clients 101A-B may be included in a client-server relationship in which the server allows the clients 101A-B to access the service by way of a network (e.g., the internet). In some examples, the clients 101A-B may transmit queries 104 to interact with microservices over the network. While examples herein describe a microservice architecture, the system 100 may be any computing system in a client-server relationship (e.g., monothetic architecture, etc.).

In some examples, the system 100 may include a proxy to facilitate requests 104 from clients 101A-B to microservices. For instance, the system may include an API gateway 106 which serves as a single entryway for client 101A-B interactions with microservices. The API gateway 106 may include a software application between one or more clients (e.g., clients 101A-B) and a set of backend microservices. In some examples, the API gateway 106 serves as a reverse proxy to accept API calls from the client applications (e.g., clients 101A-B). In some examples, the API gateway 106 may forward the API calls (e.g., queries 104) to the appropriate microservice. In some examples, the API gateway 106 may be deployed on server within a shared network associated with the worker nodes 102A-C and storage clusters 103A-C. For instance, the API gateway 106 may be deployed on one or more servers within the shared network which receives inbound traffic and proxies outbound traffic for the worker nodes 102A-C and storage clusters 103A-C.

The clients 101A,101B may transmit queries 104 to interact with one or more backend microservices or applications. For example, the queries 104 may be an API request. For instance, the query 104 may include a GET, POST, PUT, DELETE, or BATCH function. The GET, POST, PUT, DELETE, or BATCH function may perform operations on data associated with respective microservices. For instance, a GET request may retrieve data, a POST request may publish data, or a DELETE request may delete data for a respective microservice, etc. In some examples, the web server (e.g., server within the client server relationship) may use an API to facilitate the queries 104 via the API gateway 106. By way of example, the API gateway 106 may receive a query 104 and proxy or route the query 104 to the appropriate microservice. In some examples, the microservices may be associated within one or more worker nodes 102A-C. For instance, the microservices may run on the worker nodes 102A-C. In some examples, worker nodes 102A-C may receive the query 104 and query (e.g., direct the query 104) one or more storage clusters 103A-C where data associated with the microservices may be stored to generate a query response.

For example, the system 100 may be implemented using one or more containers (e.g., standalone software package for a software application) using a container service, or on VMs (virtual machines) within a shared network. A container service may be a cloud service that allows developers to upload, organize, run, scale, manage, and stop containers using container-based virtualization to orchestrate their respective actions. A VM may include virtual computing resources which are not limited to a physical computing device. For example, the worker nodes 102A-C may be deployed in containers controlled by a container orchestration service. In some examples, the container orchestration service may manage the computing resources of worker nodes 102A-C. For instance, the worker nodes 102A-C (e.g., microservices) may be included in a single application or system. In some examples, the worker nodes 102A-C may collectively receive queries 104 from the clients 101A-B and produce an aggregated response.

By way of example, client 101A may transmit a query 104 to an application including microservice A, microservice B, and microservice C running on worker nodes 102A, 102B, and 102C respectively. The query 104 may include a request to perform an operation on data associated with microservice A and microservice B. In some examples, microservice A may utilize independent computing resources (e.g., worker node 102A) to execute a first portion of the query 104 and microservice B may subsequently or in parallel utilize independent computing resources (e.g., worker node 102B) to execute a second portion of the query 104. An aggregated response to the query 104 may be generated and proxied via the API gateway 106 to the client 101A.

The storage clusters 103A-C may be deployed using an orchestration service. The orchestration service may be associated with the orchestration service which manages the worker nodes 102A-C, or an independent orchestration service. For instance, the storage clusters 103A-C may be included in a clustered file system. The clustered file system may be software which manages (e.g., orchestrates) one or more storage clusters 103A-C. In some examples, storage clusters 103A-C may support the storage nodes. For example, the storage clusters 103A-C may include a group of storage nodes. The storage clusters 103A-C may include a group of storage nodes which functions as a storage unit. By way of examples, a storage cluster 103A-C may include three storage nodes and the storage clusters 103A,103B, 103C may be accessible by a microservice (e.g., worker nodes 102A-C) as a single storage unit. In some examples, data may be stored across the storage nodes of the storage clusters 103A-C and may be accessed as block storage (e.g., blocks of data stored across the storage nodes of the storage clusters 103A-C). For instance, the storage nodes may include a physical server with one or more HDDs (hard-disk drives) or SDD (solid-state drives). An HDD may include a storage device which may store data in the event of power loss to the storage device. An SDD may include a storage device which may always require power to store data. In some examples, the storage clusters 103A-C may include a controller (e.g., master) storage node which manages the storage nodes within the storage clusters 103A-C. For instance, the orchestration service may be deployed on a controller node within the storage clusters 103A-C to orchestrate the management of storage nodes. In some examples, the orchestration service may be deployed on a separate server independent from the storage nodes to control all storage clusters 103A-C.

In some examples, a worker node 102A-C may receive one or more queries 104 from the API gateway 106, direct the queries 104 to respective storage clusters 103A-C to interact with the specified data, and iteratively interact with other worker nodes 102A-C to produce a query response. For example, client 101B may transmit a query 104 requesting data from microservice A, microservice B, and microservice C running on worker node 102A, worker node 102B, and worker node 102C respectively. In some examples, the API gateway 106 may proxy the query 104 to microservice B first. For instance, the query 104 may include conditional nested queries (e.g., queries which are executed given a condition) which require input parameters or data associated with microservice B. Microservice B (e.g., worker node 102B) may interact with storage cluster 103B to interact with data or provide input for nested queries associated with microservice A and microservice C. Once microservice B executes a respective portion of the query 104, microservice B may call microservice A or microservice C to execute a subsequent portion of the query 104. Calling a microservice may include RPC (remote procedure call), gRPC, interservice calls, etc. Microservice A and microservice C may execute respective portions of the query 104 by interacting with storage cluster 103A or storage cluster 103C, and aggregate a query response based on the preceding microservice query execution. The aggregated query response may be transmitted via the API gateway 106 to the client 101B.

In some examples, the interactions (e.g., caller path) between microservices may be used to identify metadata associated with respective microservices. For instance, as queries 104 are transmitted from one microservice to another, the query 104 may be executed with varying degrees of performance due to the distributed computing resources (e.g., worker nodes 102A-C) supporting each microservice. For example, data such as an error rate metric, latency metric, or a request rate metric may be determined based on a respective microservice receiving a query 104. An error rate metric may include the number of errors produced by a microservice, the latency metric may include the latency (e.g., time taken to move data across a network) of the microservice, and the request rate may include the rate of queries 104 received by the microservice within a defined time (e.g., requests per second, etc.) In some examples, a caller propagation service may be used to extract metadata associated with respective microservices. For instance, a caller propagation service may generate a caller chain based on a first microservice calling a second microservice. An example of a caller propagation service and a caller chain is further described with reference to FIGS. 2-3.

In some examples, the caller chain (e.g., chain of microservice calls) may be expansive and complex. For instance, a query 104 may require tens or hundreds of microservices to generate a query response resulting in complex caller chains. To efficiently manage complex caller chains, a caller mapping may be generated to visualize the relationships between services. An example caller mapping is further described with reference to FIG. 5.

Figure 2:
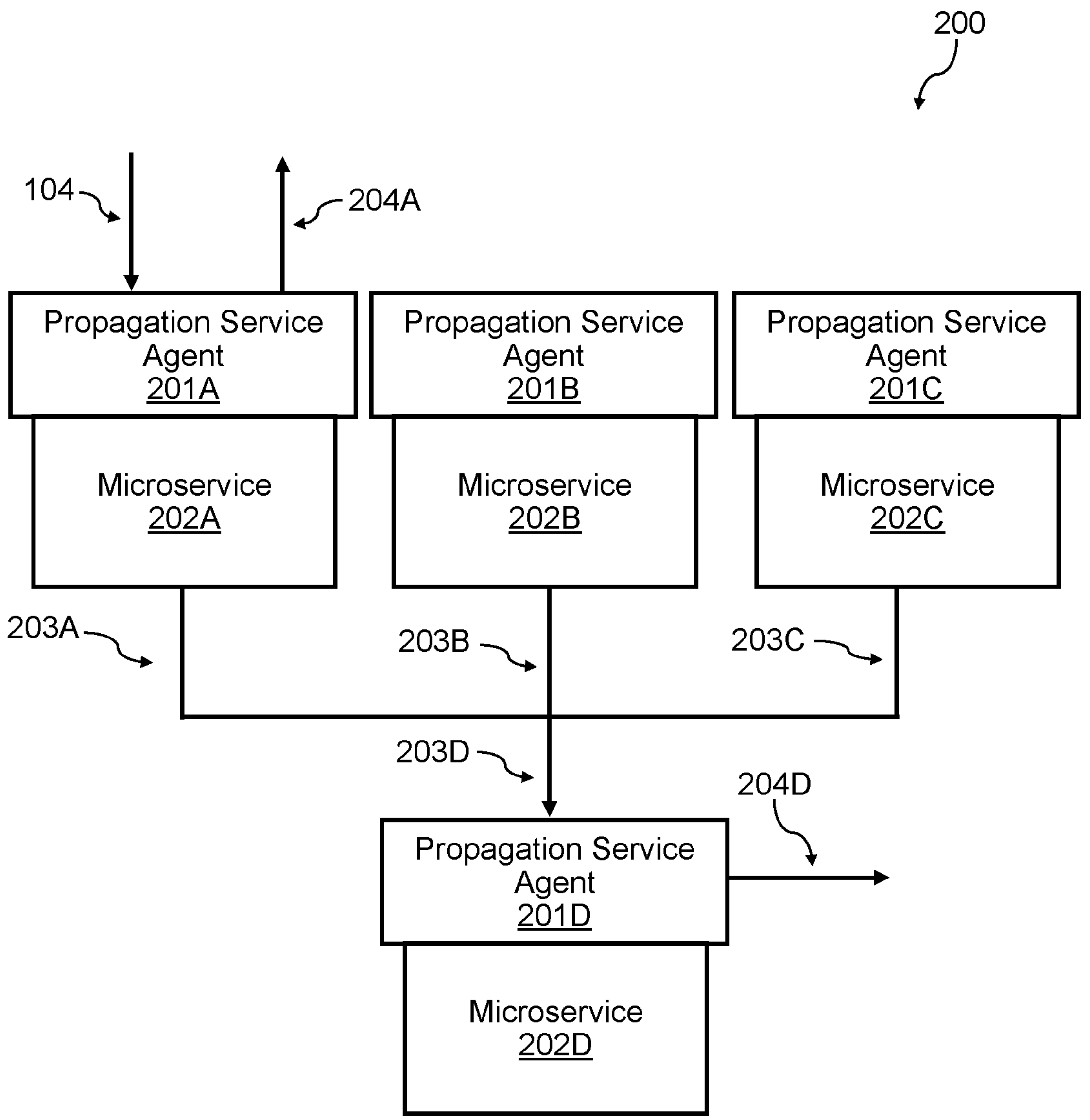
FIG. 2 depicts an example data flow pipeline according to example aspects of the present disclosure.

FIG. 2 depicts an example dataflow pipeline according to example aspects of the present disclosure. The following description of dataflow pipeline 200 is described within an example implementation in which propagation service agents 201A-D associated with a plurality of microservices 202A-D receive a query 104, make calls (e.g., RPC, API calls, etc.) to other microservices 202A-D, generate and emit bit encodings 203A-D based on the calls, and output an encoded caller chain 204D indicating a sequential chain (e.g., chain of microservice calls) of calls across the microservices 202A-D. In some examples, a query response 204A may be generated based on the plurality of microservices 202A-D processing one or more respective portions of the query 104. In other examples, the encoded caller chain 204D may be generated based on the propagation service agents 201A-D iteratively emitting bit encodings 203A-D. For instance, emitted bit encodings 203A-D may be used to generate and update a caller mapping in real-time as microservices 202A-D call each other. In some examples, the encoded caller chain 204D may indicate that a query 104 has finished executing and update the caller mapping to indicate (e.g., via the caller mapping) the completion of the request.

The microservices 202A-D may include software configured to execute computer operations for a specific service among a plurality of services for an application. For instance, microservices 202A-D may be associated with a microservices architecture where respective microservices 202A-D are configured to execute respective functions (e.g., services) for an application. In some examples, the microservices 202A-D may be included in a single application which includes the functionality of all of the microservices 202A-D. For instance, a monolithic architecture may be implemented in which a single code base executes the functionality of each of the microservices 202A-D.

In some examples, the microservices 202A-D may be decentralized and run on different servers or nodes. For instance, the microservices 202A-D may run on one or more worker nodes 102A-C. The microservices 202A-D may serve a single function and communicate (e.g., via API communication) with other microservices 202A-D to provide features, data, interfaces, etc. for an application.

By way of example, microservice 202A and microservice 202C may be included in a ridesharing application and communicate to offer products or ride sharing services to a user. For instance, a user may interact with a ride sharing client application (e.g., client 101A-B) running on a user device associated with the user to request ridesharing services. Microservice 202A may be an independent service configured to aggregate all drivers for the ridesharing service and microservice 202C may be an independent service configured to determine a fare or cost of the requested service. The user may transmit via the client 101A-B a query 104 to return all ride sharing service options and costs to present (e.g., via the client 101A-B) to the user based on the user's location. Microservice 202A may receive the query 104, determine all available drivers, and call microservice 202C to determine a fare associated with the request. For instance, microservice 202A may transmit an API call, RPC, etc. to microservice 202C after processing part of the query 104. Microservice 202C may receive the API call from microservice 202A and generate a query response 204A. For instance, the query response 204A may be transmitted to the user device (e.g., clients 101A-B) to display driver options and associated fares for the user's ride share service request.

In some examples, the microservices 202A-D may call a plurality of other microservices 202A-D to produce a query response 204A. As microservices 202A-D call other microservices 202A-D, propagation service agents 201A-D may be used to generate a bit encodings 203A-D indicating the latest caller (e.g., microservice 202A-D, node, etc.) in an encoded caller chain 204D.

For instance, the propagation service agents 201A-D may include a software agent running within or alongside the software of its respective microservice 202A-D. For example, the propagation service agents 201A-D may run in the container (e.g., within a container orchestration) or on the node (e.g., worker nodes 102A-C) with the microservices 202A-D. The software may include a monitoring software agent which detects inbound and outbound API calls for the respective microservice 202A-D. The propagation service agents 201A-D may be configured to execute distributed call tracing by aggregating the chain of events (e.g., inbound/outbound API calls) for microservice 202A-D interactions. For example, the propagation service agent 201A-D may be configured to detect an API call received by the respective microservice 202A-D and identify the computing processes (e.g., caller service) which generated the request. In some examples, the propagation service agent 201A-D may be configured to detect an API call transmitted by the respective microservice 202A-D and identify the recipient of the request.

The propagation service agent 201A-D may be configured to generate traces (e.g., API trace) identifying respective microservices 202A-D (e.g., nodes) which generated the API call and encode the call path (e.g., the service name, endpoint, etc.) to generate a bit encoding 203A-D. Bit encodings 203A-D may generated using a data encoding scheme. For instance, the call path (e.g., the service name, endpoint, etc.) may be hashed using one or more algorithms which transform the call path into a fixed string of characters which represent the original values. Example algorithms may include XXHash, Wyhash, or other non-cryptographic hash algorithms which create 32-bit, 64-bit, or 128-bit hashes for a given string. In some examples, encoding or hashing the call path may reduce the size of the call path. For example, as the number of microservices 202A-D in the caller chain 204D increases, the hashed values (e.g., bit encoding 203A-D) may limit the increase of the file size by hashing longer or complex caller chains 204D into a fixed length. In some examples, a base-36 string can be used to represent the bit encodings 203A-D, using digits, lower-case letters [0-9,a-z], etc. As the output of an example algorithm can be a 64-bit hash, converting into a base-36 string results in a max length of 13. For instance, the bit encoding 203A-D size may be limited to 13-bytes.

By way of example, the propagation service agents 201A-D may generate prefix hashes (e.g., keys) for each call path. For instance, an example caller path may include path A>B>C>D indicating that microservice A called microservice B, microservice B called microservice C, etc. The propagation service agents 201A-D may generate the following hash h(a)=h(a), h(a, b)=h(h(a), b), h(a, b, c)=h(h(a, b), c), h(a, b, c, d)=h(h(a, b, c), d). In some examples, each node (a, b, c, d) may represent a <service, endpoint> tuple. For example, node a, h(a)=h(serviceA–endpointA) represents the hash of <service, endpoint>. As requests (e.g., queries 104) flows through downstream nodes (e.g., microservices 202A-D), the keys will be updated across every request in the call path. Once the caller chain has been encoded, the propagation service agents 201A-C may emit the bit encodings 203A-D (e.g., hashes), where they may be decoded, inspected, and utilized to visualize the relationships between microservices 202A-C.

For instance, the propagation service agents 202A-D may be associated with a caller propagation service. A caller propagation service may communicate with the propagation service agents 202A-D to receive traces from the propagation service agents 201A-D, index them, and store them. For instance, the caller propagation service may be associated with a data store. An example of the caller propagation service is further described with reference to FIG. 3.

In some examples, the bit encodings 203A-D may indicate additional information regarding the caller path. For example, as microservices 202A-D receive requests from other services, information such as the latency (e.g., time taken to move data across a network), request rate (e.g., how many requests have been made over a period of time), or an error rate (e.g., a rate of fails requests to other services) may also be captured by the propagation service agents.

For example, as traces (e.g., call paths) are propagated by the propagation service agents 202A-D, metadata such as the error rate, latency, and request rate may be attached to the body of the request (e.g., query 104). The metadata may be associated with a parent span (e.g., initial request) and child spans (e.g., subsequent calls to other services). Spans may be associated with a span id to indicate the identity of the span and any parent/child span relationship. A span may include an operation name (e.g., request id, etc.), start time, duration, etc. In some examples, one or more spans may form a trace.

The propagation service agents 202A-D may be configured to propagate a trace based on parent and child spans with metadata associated with the request. The metadata, in addition the caller path, may be used to generate analytics and visualizations of the caller paths between microservices 202A-D and metrics.

By way of example, microservice 202B may receive a query 104, process a portion of the query 104 and call microservice 202D. The propagation service agent 201B may generate a trace based on a parent span (e.g., span id) indicating metadata associated with the call. For instance, the parent span may indicate that microservice 202B has received 400 queries 104 per second (e.g., request rate) of which 12 have failed (e.g., error rate metric). The parent span may also indicate that the query 104 received by microservice 202B took 23 ms (milliseconds) to obtain a response from the system (e.g., storage cluster 103A-C). As microservice 202B calls microservice 202D, the propagation service agent 201B may generate and emit a bit encoding 203B indicating the caller path from microservice 202B to microservice 202D and include the span id to indicate metadata associated with the request. In some examples, microservice 202D may receive the request and the propagation service agent 201D may determine a child span (e.g., span id) with metrics associated with the processing of the request by microservice 202D. This iterative process may continue for each subsequent call made. Once the query 104 has been executed, the encoded caller chain 204D may include the caller path (e.g., sequential chain of calls between services) and metadata (e.g., span id) associated with the execution of the query 104 by the respective microservices 202A-D in the encoded caller chain.

In some examples, the propagation service agents 201A-D may emit the bit encodings 203A-D and iteratively update a caller chain 204D stored within a caller propagation service. By way of example, middleware may be used to capture the bit encodings 203A-D and store them in a data store associated with a caller propagation service. Example middleware may include event streaming or event logging software which interfaces between the caller propagation agents 201A-D and a data store. In some examples, middleware may interface between the caller propagation service and a remote computing system. For instance, the middleware may be configured to monitor the output emitted bit encodings 203A-D, encoded caller chains 204D, etc. of the propagation service agents 202A-D and log emitted bit encodings 203A-D in a data store associated with the caller propagation service. In some examples, the middleware may also be configured to notify a remote computing system of the bit encodings 203A-D and encoded caller chain 204D being stored in a data store to facilitate analytics or visualization (e.g., caller mapping) of the data. Example data stores associated with the caller propagation service is further described with reference to FIGS. 3-4. Example visualizations (e.g., caller mappings) of the data stored in a data store is further described with reference to FIG. 5

In some examples, the caller path may terminate (e.g., stop calling other services, generate query response 204A, etc.) and the propagation service agent 201A-D may emit an encoded caller chain 204D. The caller chain 204D may be decoded and inspected by the caller propagation service before being stored in a storage system. In some examples, the caller chain 204D may be utilized to visualize the relationships between microservices 202A-C. For instance, a graphical user interface indicating a caller mapping of services may be generated based on the caller chain 204D. An example graph of services if further described with reference to FIG. 5.

By way of example, microservice 202A may receive a query 104 requesting food delivery options for a user. Microservice 202A may call via API microservice 202B, microservice 202B may call via API microservice 202C, and microservice 202 may call via API microservice 202D. For instance, microservice 202A may be a service associated with food vendors, microservice 202B may be a service associated with delivery drivers, microservice 202C may be a service associated with fees or costs for food delivery requests, and microservice 202D may be associated with payment processing. As such the microservices 202A-D may work together to process the query 104 for a food delivery service application. As microservices 202A-D call each other, bit encodings 203A-D may be emitted to generate and update a caller mapping in real-time. Once the query 104 has been executed, the aggregates query result 204A may be transmitted by the microservices 202A-D to the request client device (e.g., client 101A-B). In some examples, propagation service 201D may emit an encoded caller path 204D indicating the finished order of calls made across the microservices 202A-D. For instance, the encoded caller path 204D may be used to update the caller mapping to display a completed query 104.

Figure 3:
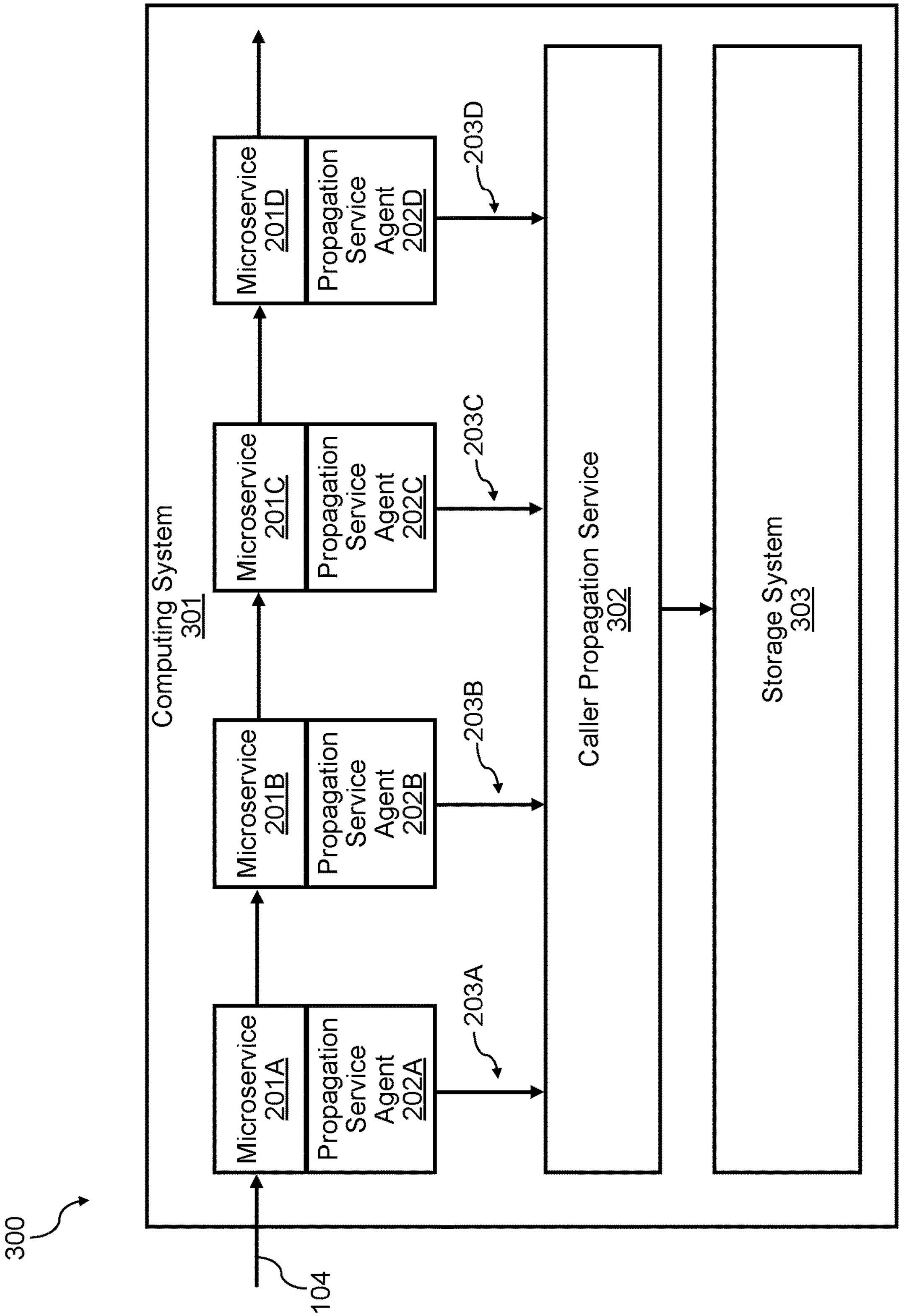
FIG. 3 depicts an example data flow pipeline according to example aspects of the present disclosure.

FIG. 3 depicts an example dataflow pipeline according to example aspects of the present disclosure. The example dataflow pipeline 300 is described with an example implementation in which microservices 201A-D within a computing system 301 receive a query 104, propagation service agents 202A-D generate and emit bit encodings 203A-D as the microservices 201A-D call each other, and a caller propagation service 302 receives the bit encodings 203A-D to orchestrate the storage of the bit encodings 203A-D in a storage system 303.

The computing system 301 may be an application system. For instance, the computing system 301 may be implemented on a server, on a combination of servers, or on a distributed set of computing devices which communicate over a network such as the Internet. For example, the computing system 301 may be distributed using one or more servers and/or mobile devices. In some examples, the computing system 301 may be implemented as part of, or in connection with a computing ecosystem, where, for example, user devices (e.g., clients 101A-B, etc.) interact with the computing system 301 (e.g., application server, etc.) by transmitting one or more queries 104 executable by one or more microservices 201A-D of the computing system 301.

For instance, the computing system 301 may operate as an information inlet and/or outlet for the clients 101A-B to exchange or interact with data stored within the storage system 303. The computing system 301 may include a number of subsystems and components for performing various operations. For example, the computing system 301 may include microservices 201A-D which execute specific functions for the computing system 301, propagation service agents 202A-D for tracing calls between microservices 302A-D, a caller propagation service 302 for aggregating traces (e.g., bit encodings 203A-D) from the propagation service agents 202A-D, and a storage system 303 for storing data associated with the computing system 301.

The computing system 301 may be any computing device that is capable of exchanging data and sharing resources. For example, the computing system 301 may include one or more networked devices configured to store or transmit data over physical or wireless technologies. In some examples, the computing system 301 may include hardware and software. In other examples, the computing system 301 may include physical equipment that is connected to a physical network.

The storage system 303 may be implemented on a server, on a combination of servers, or on a distributed set of computing devices which communicate over a network such as the internet. For example, the storage system 303 may be a distributed file system. A distributed file system may include a set of client and server services that allow servers to organize distributed file shares into a single distributed file system. In some examples, the storage system 303 may include a file system that enables clients (e.g., clients 101A-B) to access file storage via microservices 201A-D from multiple hosts through a computer network. In some examples, the storage system 303 may include any type of file system where data may be stored. For instance, the storage system 303 may include various types of storage such as HDD storage or SDD storage. In some examples, the storage system 303 may manage various types of storage in a distributed manner. In other examples, the storage system 303 may be associated with or communicate with task computation software to facilitate a the retrieval of data logs distributed across the storage system 303. Task computations may include software components which generate tasks or a set of tasks to fetches data in the storage system 303. An example of task computation is further described with reference to FIG. 4. A remote computing system may read the logs stored in the storage system 303 and generate a caller mapping. An example caller mapping is further described with reference to FIG. 5.

The caller propagation service 302 may include software which runs on one or more servers of the storage system 303. For instance, the caller propagation service 302 may include a plurality of instances which run in parallel across one or more servers of the storage system 303. In some examples, the caller propagation service 302 may include a single instance on a single server. The caller propagation service 302 may include software configured to receive bit encodings 203A-D, inspect them, and index them the in the storage system 303.

For instance, the caller propagation service 302 may expose one or more ports to the nodes running the microservices 201A-D, propagation service agents 303A-D, etc. Ports may indicate a defined number associated with a networking protocol that receives or transmits communication for a specific service. For instance, the caller propagation service 302 may include one or more ports configured to receive emitted bit encodings 203A-D. In some examples, the caller propagation service 302 may include one or more ports configured to receive spans (e.g., metadata). The propagation service agents 201A-D may emit bit encodings 203A-D including spans ids to the caller propagation service 302 via one or more ports using gRPC (gRPC Remote Procedure Calls), HTTP (hypertext transfer protocol), or other protocols. In some examples, the propagation service agents 201A-D may communicate via UDP (user datagram protocol).

The caller propagation service 302 may decode and inspect the bit encodings 203A-D. For example, as propagation service agents 202A-D emit bit encodings 203A-D, a mapping of the caller chain 204D to the corresponding bit encodings 203A-D can be generated and stored in the storage system 302. The mapping can include a database table or any other data structures which can be stored in a storage system 303. Data from the mapping can be used to identify the caller chain 204D for a given hash.

For example, the caller propagation service 302 can determine, based on the mapping, respective callers (e.g. microservice 201A-D) of a service (e.g., caller chain 204D). The caller chain 204D can be represented as a string. By way of example, the caller chain 204D can be represented as CO: {"service": "a", "procedure": "b"}. A mapping of the caller (e.g., C0) can be assigned to a temporary node (e.g., temp_node=C0). To decode the caller chain 204D, the caller propagation service 302 can search for all hashes for the callers of temp_node in a specified time window (e.g., spans, etc.). For every hash found, the caller propagation service 302 can evaluate whether a service, endpoint tuple equals a hash value. For instance, the logic can be represented as (h(hf, temp_node.service–temp_node.endpoint)=temp_hash. If true, the caller propagation service 302 can determine the set of caller nodes as indicated by the hashed caller chain 204D. The caller propagation service can iterate through these steps to identify root notes (e.g., first caller) and leaf nodes (e.g., subsequent callers). In some examples, the caller propagation service 302 can process and decode the bit encodings 203A-D offline.

In some examples, the caller propagation service agents 202A-D may not emit a caller chain 204D. For example, each call (e.g., hop) to a microservice 201A-D may cause the caller propagation service agent 202A-D to emit a hash (e.g., bit encoding 203A-D) that it receives with an incoming request and the immediate (e.g., latest) caller. By aggregating this information from all the hops in an offline fashion, a full caller-chain mapping may be constructed. In some examples, this emission by each caller propagation service agent 202A-D may be sampled. In some examples, only one emission per unique caller may be needed to construct the full caller chain mapping. In some examples, the caller propagation service 302 may collect bit encoding 203A-D from respective caller propagation service agents 202A-D which include the latest caller of the associated microservice 201A-D and the caller propagation service 302 may construct a mapping of the caller chain 204D offline.

In some examples, the bit encoding 203A-D may be sampled. For instance, microservices 201A-D may repeatedly call the same microservice 201A-D over a period of time (e.g., span). In some implementations, the caller propagation service agents 202A-D may sample (e.g. select a subset) the repetitive calls and generate bit encodings 203A-D based on the sample. Sampling the calls may allow for efficiencies within the caller propagation service 302. For instance, the caller propagation service 302 can avoid constructing and propagating a caller mapping for repetitive calls between the same microservices 201A-D. As such the caller propagation service 302 can create mappings based on a small fraction of the actual calls between microservices 201A-D.

For example, the caller propagation service 302 may be configured to receive the bit encodings 203A-D (e.g., hashed traces) and execute a processing pipeline. A processing pipeline may include a series of functions which validates the bit encodings 203A-D (e.g., identify the propagation service agent 202A-C, etc.) based on the hashing key, indexes the bit encodings 203A-D in the storage system 303, and perform any transformations before storing them. An example transformation may include transforming the bit encodings 203A-D into a digestible format for a remote computing system. An example of a remote computing system is further described with reference to FIG. 4

By way of example, a query 104 may be received by the computing system 301. Microservice 202A may execute a portion of the query 104 and call microservice 202B. Propagation service agent 201A may generate and emit bit encoding 203A based on microservice 202A calling microservice 202B. The process may continue for microservices 201B-D and respective propagation service agents 202C-D may generate and emit bit encodings 203B-D. The caller propagation service 302 may receive via one or more ports the bit encodings 203A-D and identify the respective propagation service agent 202A-D which generated the bit encoding 203A-D to validate them. In some examples, the caller propagation service 302 may index the bit encodings 202A-D. Indexing may include generating search keys and pointers indicating the specific location within the storage system 303 where the bit encodings 202A-D will be stored. For instance, the caller propagation service 302 may generate an index to allow task computations to more efficiently search the storage system 303. After indexing the bit encodings 203A-D, the caller propagation service 302 may perform one or more transformations. For instance, the bit encodings 203A-D may be transformed into a string value or more readable format for systems which query the storage system 303. Once the caller propagation service 302 has executed respective transformations, the bit encodings 203A-D may be stored in the storage system 303.

In some examples, the caller propagation service 302 can expose call-path-hash mappings such that they are available to the caller propagation service agents 202A-D at the time of emitting the metric. For instance, the caller propagation service agents 202A-D can directly emit the refined/processed metrics instead of emitting bit encodings 203A-D. By way of example, the mappings can be stored on respective containers or nodes (e.g., worker nodes 102A-C, etc.) associated with respective microservices 202A-D. The mapping can be stored in memory and become quickly queryable at runtime. For instance, the mappings can be stored in an optimal data structure such as Map/Trie/Ordered list that has limited size and is queryable at runtime. For respective bit encodings 203A-D generated by the caller propagation service agents 201A-D, the mappings can be stored locally on the container. For instance, a background service can obtain the bit encodings, generate the mappings and store the mappings locally. As such, the caller propagation service agents 201A-D can directly emit metrics to be consumed by a remote computing system. The remote computing system can generate a caller mapping, based on the emitted metrics. An example caller mapping is further described with reference to FIG. 5.

Figure 4:
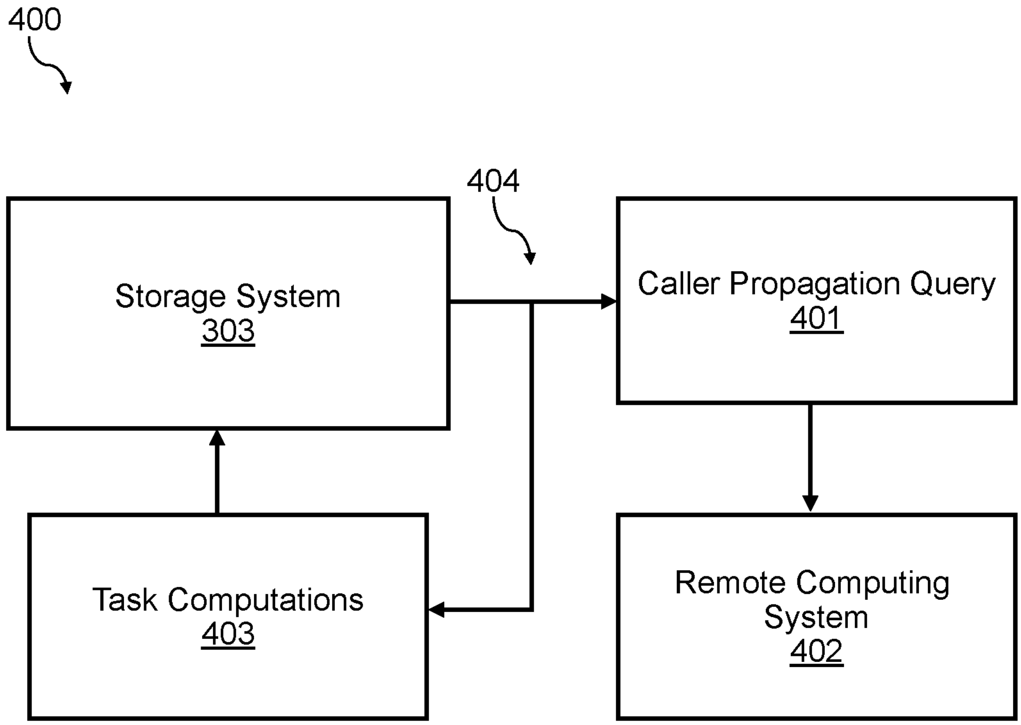
FIG. 4 depicts an example data flow pipeline according to example aspects of the present disclosure.

In some examples, the propagation service 302 may be configured to extract metadata associated with the bit encodings 203A-D. For instance, the caller propagation service 302 may utilize a span id, to request or receive transmission of the metadata associated with the span id via one or more ports. For example, the metadata associated with the span id may be stored on the nodes (e.g., work nodes 102A-C) which supports the microservice 201A-D. The caller propagation service 302 may retrieve the metadata using the span id. In some examples, the caller propagation service 302 may generate log data which includes the caller path (e.g., from the encoded caller chain 204D, bit encodings 203A-D, etc.) and the associated metadata. For instance, the caller propagation service 302 may index and store the bit encodings 203A-D with a pointer to associated metadata (e.g., the respective span) in the storage system 303. In some examples, the storage system 303 may be utilized as a data source to visualize the caller chains 204D across a plurality of microservices 201A-D. For example, the storage system may be queried by a remote computing system which may utilize data (e.g., log data) to generate one or more caller mappings. A caller mapping may indicate the complete path of calls made across respective microservice 202A-D and indicate performance metrics associated with the execution of the request by each microservice 202A-D. An example of a caller mapping is further described with reference to FIG. 5. FIG. 4 depicts an example dataflow pipeline according to example aspects of the present disclosure. The example dataflow pipeline 400 is described with an example implementation in which the storage system 303 transmits data logs 404 to a remote computing system 405. In the example dataflow pipeline 400, a caller propagation query 401 may query the data logs 404 from the storage system 303 and trigger one or more task computations 403 to retrieve the requested data logs 404. The data logs 404 may be transmitted to the remote computing system 402 where, for example, one or more caller mappings may be generated on a user interface of the remote computing system 402.

The caller propagation query 401 may include software which retrieves data logs 404 from the storage system 303. In some examples, the caller propagation query 401 may be implemented on one or more servers of the storage system 303. For instance, the caller propagation query 401 may run on a storage node in a storage cluster 103A-C. In some examples, the caller propagation query 401 may be implemented on more servers of the remote computing system 402. For instance, the caller propagation query 401 may include a mechanism by which a user may interact with the remote computing system 402 to query data logs 404 stored in the storage system 303.

The task computations 403 may include software to facilitate a set of tasks or computations that are executed in a distributed computing environment. For instance, the storage system 303 may be a distributed file system. In some examples, the data logs 404 may include large quantities of data dispersed across the storage system 303. The task computations 403 may include software which orchestrates the generation of tasks, or set of tasks, which retrieves the requested data logs 404 to be transmitted to the remote computing system 402. For instance, task computations may utilize the index generated by the storage system 303 to locate and quickly search data logs within the storage system 303. Task computations, based on the index may generate one or more tasks or sets of tasks to retrieve the requested data logs.

In some examples the task computations 403 may be implemented on one or more servers of the storage system 303. For instance, the task computations 403 may run in one or more containers or nodes within the storage system 303. In some examples, the tasks computations 403 may be configured to receive requests from the caller propagation query 401. For instance, the caller propagation query 401 may generate a request based on a user interacting with the remote computing system 402. In some examples, the caller propagation query 401 may schedule requests (e.g., CRON (Command Run On) jobs, etc.) on a reoccurring basis. The caller propagation query 401 may generate a request for data stored within the storage system 303 and the task computations 403 may generate one or more tasks or sets of tasks to retrieve and transmit data logs 404 to the remote computing system 402.

The remote computing system 402 may include a mobile computing device, such as a smartphone, tablet computer, laptop computer, VR or AR headset device, and the like. As such, the remote computing system 402 may include components such as a microphone, a camera, a satellite receiver, and a communication interface to communicate with external entities using any number of wireless communication protocols. The remote computing system 402 may include a user interface to display one or more applications. For instance, the remote computing system 402 may store a data analytics application in a local memory. In some examples, the memory may store additional applications executable by one or more processors of the remote computing system 402, enabling access and interaction with one or more servers over one or more networks. For instance, the remote computing system 402 may communicate with the storage system 303 over one or more networks such as the internet.

In some examples, the remote computing system 402 may be associated with one or more users. For instance, a user may interact with the one or more analytical applications displayed on the user interface of the remote computing system 402. In some examples, the user may submit a request for data logs stored in the storage system 303. In some examples, the analytical applications may interact with or utilize the caller propagation query 401 to generate a request for data logs 404. In other examples, the analytical applications may automatically generate a request. For instance, upon accessing (e.g., page load) the analytical applications, the analytical applications may generate a request to retrieve data logs 404 needed to populate one or more user interface elements (e.g., caller mappings, charts, dashboards, etc.) of the analytical applications. In some examples, the analytical applications may receive the data logs 404 and generate a caller mapping. An example caller mapping is further described with reference to FIG. 5.

Figure 5:
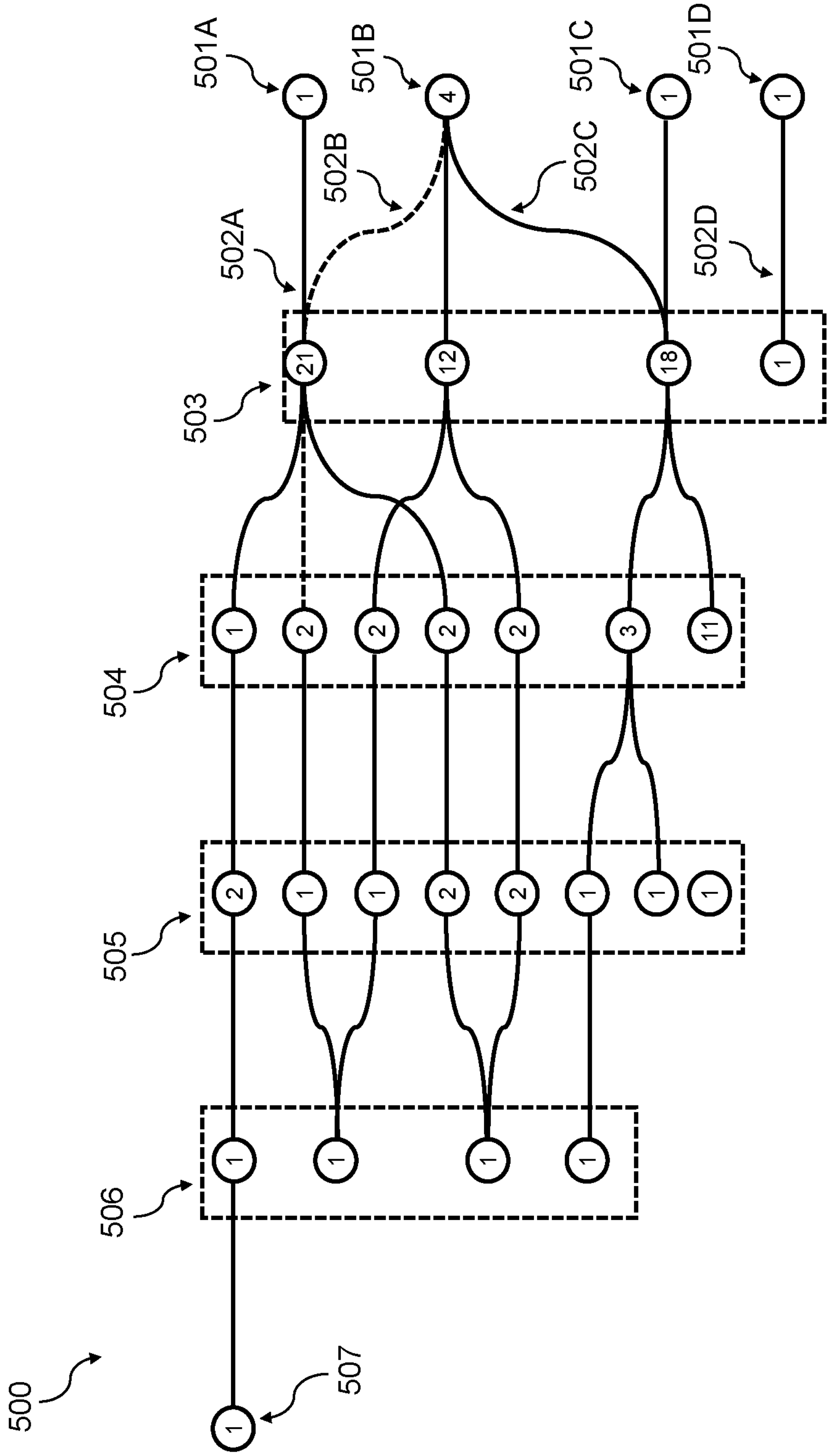
FIG. 5 depicts an example caller mapping according to example aspects of the present disclosure.

FIG. 5 depicts an example caller mapping according to example aspects of the present disclosure. The example caller mapping 500 may be generated by the remote computing system 402, based on data logs 404 received by the remote computing system 402. The example caller mapping may include one or more parent nodes 501A-D, edges 502A-D, and subsequent nodes 503, 504, 505, 506, 507. The caller mapping 500 may depict the caller chain 204D. For instance, the caller mapping 500 may depict the sequential order of calls across a plurality of microservices 202A-D. Each of the subsequent nodes 503, 504, 505, 506, 507 have not been explicitly discussed for brevity. One of ordinary skill in the art will understand that each of the depicted, parent nodes 501A-D, and subsequent nodes 503, 504, 505, 506, 507 may represent an individual microservice 202A-D or computing process within a computing system 301.

For example, the caller mapping 500 may indicate that node 501A represents microservice 202A. As depicted in the caller mapping 500, the edge 502A may connect node 501A and node 503 to indicate that microservice 202A called microservice 202B. For instance, node 503 may represent microservice 202B. The nodes (e.g., nodes 501A-D, 503, 504, etc.) may represent microservices 202A-D. The edges 502A-D, etc. may indicate the caller and callee. For instance, the edges 502A-D may indicate that one microservice 202A-D called another service.

In some examples, the caller graph 500 may depict the respective microservices 202A-D required to generate a query response 204A. For example, a user may interact with the remote computing system 402 to filter or request data logs 404 associated with a time span, or set of queries 104. For instance, the user may calibrate the caller graph 500 and focus on one or more queries 104 or microservices 202A-D to determine how services interact with each other to serve queries 104.

By way of example, a user may calibrate the caller mapping 500 to display microservices 202A-D. Microservice 202A-D may be represented by nodes 501A-D on the caller mapping 500. In some examples, the user may filter the caller mapping 500 to display queries 104 received by the computing system 301 during peak hours (e.g., peak hours for a ride share application). The caller mapping 500 may generate a request (e.g., via the caller propagation query 401) to retrieve data logs 404 associated with microservices 202A-D during peak hours from the storage system 303. One or more task computations 403 may facilitate the retrieval of the data logs 404 and the caller mapping 500 may be displayed via the user interface of the remote computing system 402. The caller mapping 500 may indicate each of the nodes 503, 504, 505, 506, 507 called by microservices 202A-D (e.g., nodes 501A-D). For example, the edges 502A-D, etc. may display the connections between services and the respective calls made to downstream services.

In some examples, metadata such as error rates, latency, or request rates may be displayed as metrics on the caller mapping 500. For instance, the edges 502A-D may be color coded to indicate metrics associated with the calls. By way of example, edge 502B may be displayed as the color red to indicate a high latency metric or a high error rate metric for calls between node 501B and node 503. In another example, nodes (e.g., 501A-D, etc.) may be color coded to indicate metrics associated with the microservice 202A-D. For instance, node 501D may be displayed as orange to indicate a high requests rate metric which is reducing performance of the microservice 202A-D. In some examples, edges 205A-D and/or microservices 202A-D may be green to indicate the services are operating as expected and calls are satisfying SLAs (service level agreements). While examples described metrics as colors, metric information is not limited to such embodiment. Metrics may be displayed as icons, visual graphics, numbers, or any other indications for the health of the microservices 202A-D or efficiency of calls made to other services. For instance, the caller mapping 500 may be interactable where, for example, a user may click or expand one or more user interface elements to view more metadata associated with the respective element.

In some examples, the metadata can be used to facilitate quotas for respective microservices 201A-D. Quotas can protect the system or respective microservices 210A-D against unwanted call volumes, prevents storage cost implications and degradations due to unexpected call patterns. For instance, the metadata can provide visibility into the cost associated with each caller. For example, a respective custodian or system owner of a microservice 201A-D can determine, based on the caller mapping 500 and metadata, one or more parameters on which a quota can be enforced. In some implementations, quotas can be enforced on specific endpoints within a microservice 201A-D. The quota can include a plurality of rules to limit the RPS (requests per second) based on configurable parameters. For example, the quotas can be pre-defined or dynamic.

Figure 6:
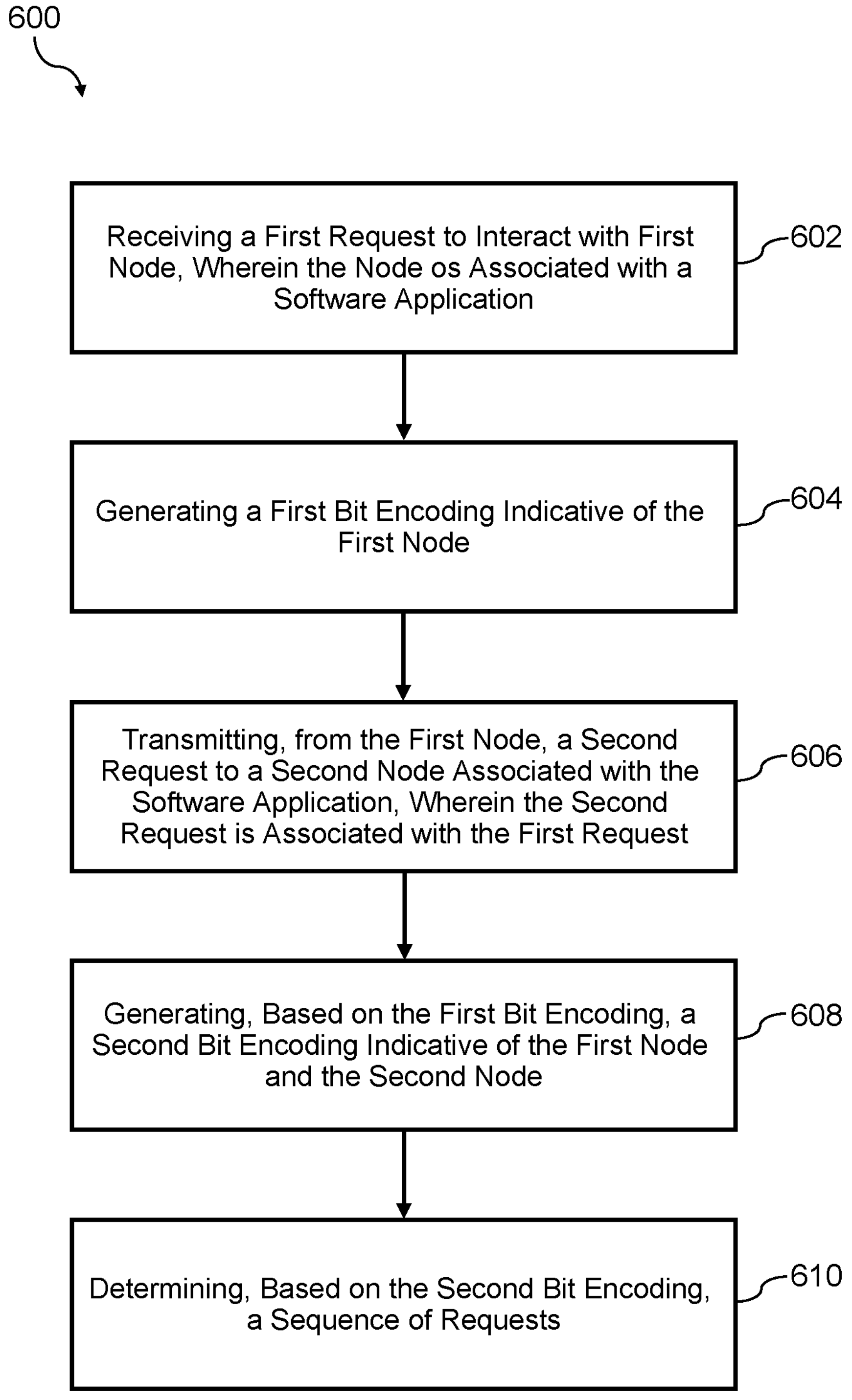
FIG. 6 depicts an example flowchart diagram of an example method according to example aspects of the present disclosure.

FIG. 6 depicts a flowchart diagram of an example method according to example aspects of the present disclosure. One or more portion(s) of the method 600 may be implemented by one or more computing devices such as, for example, the computing devices/systems described in FIGS. 2, 3, 4, 5, etc. Moreover, one or more portion(s) of the method 600 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 600. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 600 may include a step 602 or otherwise begin by receiving a first request to interact with first node, wherein the first node is associated with a software application. For instance, microservice 202A-D may be associated with a food delivery service application. The food delivery service application may be architected into a microservices architecture, where a plurality of microservices 202A perform independent and specific functions related to the facilitating the food delivery service application to users.

A user may interact with a client device (e.g., client 101A-B) to transmit a query 104 for food delivery service options near the user. The query 104 may be received by an application computing system (e.g., computing system 301). For instance, the application computing system 301 may be associated with the food delivery service application. Microservice 202A may be a service within the computing system 301 configured to retrieve all food vendors in a geographic region. In some examples, microservice 202A may receive the query and generate an array of food vendors in a geographic region near the user.

In an embodiment, the method 600 may include a step 604 or otherwise continue by generating a first bit encoding indicative of the first node. For instance, microservice 202A may determine a separate service is required to locate drivers which are available to deliver food from the identified food vendors. Microservice 202B may be configured to identify available delivery drivers in a geographic region. In some examples, a propagation service agent 201A may detect microservice 202A calling microservice 202B and generate a bit encoding 203A. For example, the propagation service agent 201A may be configured to generate a parent span (e.g., API trace) identifying respective microservices 202A-B within a caller path and encode the call path (e.g., the service name, endpoint, etc.) to generate a bit encoding 203A. The bit encodings 203A may be generated using a data encoding scheme. For instance, the call path (e.g., the service name, endpoint, etc.) may be hashed using one or more algorithms which transform the call path into a fixed string of characters which represent the original values.

In an embodiment, the method 600 may include a step 606 or otherwise continue by, transmitting, from the first node, a second request to a second node associated with the software application, wherein the second request is associated with the first request. For instance, microservice 202A may call microservice 202B and request that microservice 202B retrieve all available delivery drivers in a geographic region near the user. Microservice 202B may execute the request and determine another service is required to determine a price for both the food items and the delivery fee. For instance, microservice 202B may call microservice 202C. Microservice 202C may be configured to estimate costs for a given food delivery request.

In an embodiment, the method 600 may include a step 608 or otherwise continue by, generating, based on the first bit encoding, a second bit encoding indicative of the first node and the second node. For instance, propagation service agent 201B may detect microservice 202B calling microservice 202C and generate a bit encoding 203B. In some examples, the bit encoding 202B may indicate that microservice 202A called microservice 202B and microservice 202B called microservice 202C. For instance, the propagation service agent 201B may be configured to generate a hashed caller path indicating the first two callers (e.g., microservice 202A-B) in the caller chain.

In an embodiment, the method 600 may include a step 610 or otherwise continue by, determining, based on the second bit encoding, a sequence of requests. For instance, microservice 202C may generate estimated costs associated with food delivery options near the user and generate a query response 204A. In some examples, the caller propagation agent 201C may determine the query 104 has been executed and emit an encoded caller chain 204D indicating the complete sequence of requests from microservice 202A to microservice 202B and microservice 202B to microservice 202C. A caller propagation service 302 may receive the emitted bit encodings 203A-C and encoded caller chain 204D and store them in a storage system 303. For instance, data logs may be generated based on the bit encodings 203A-C, associated metadata (e.g., spans), and be used to generate a caller mapping 500.

Figure 7:
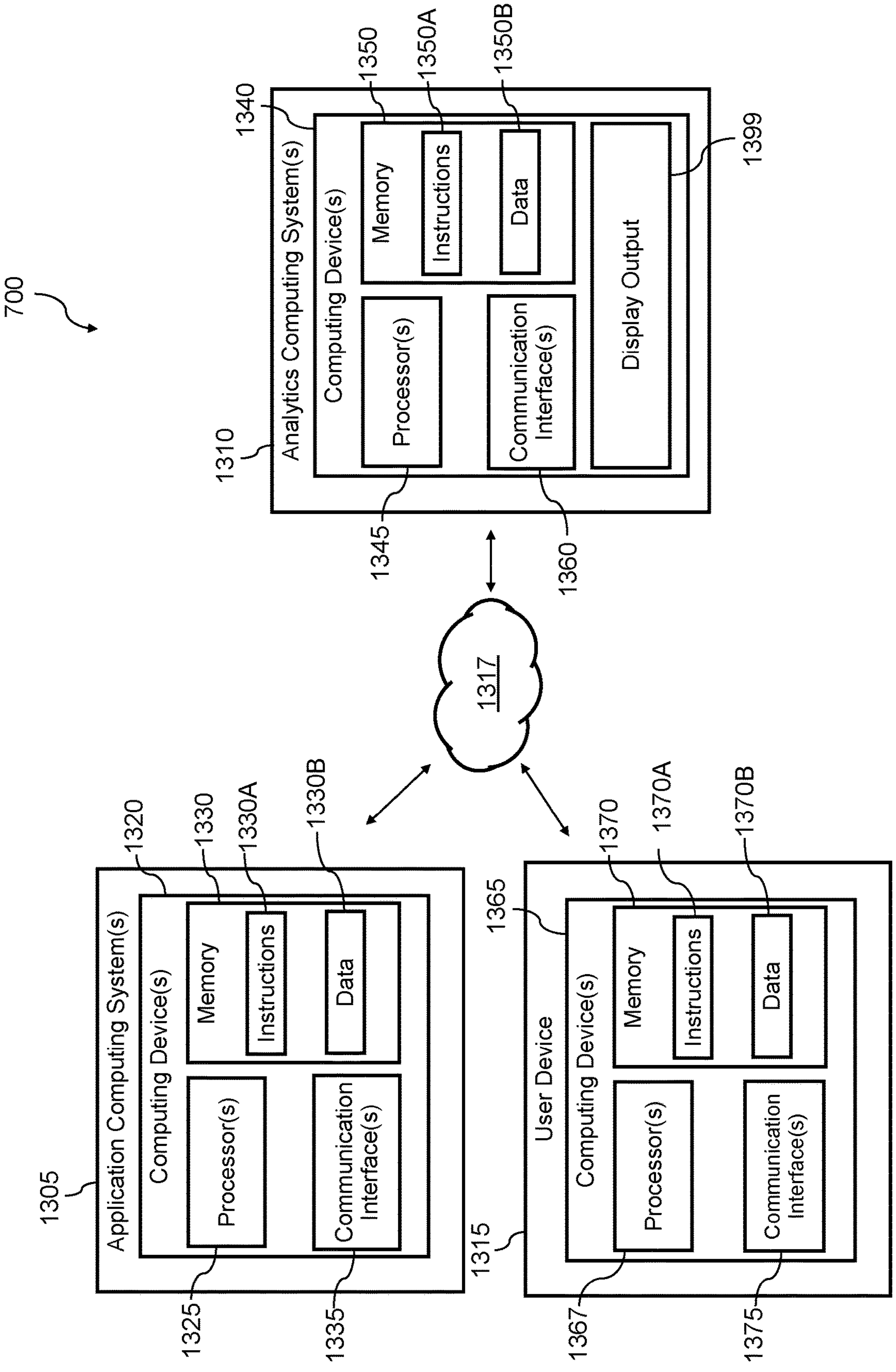
FIG. 7 depicts an example computing ecosystem according to example aspects of the present disclosure.

FIG. 7 depicts a block diagram of an example system depicts a block diagram of an example system 700 for implementing systems and methods according to example embodiments of the present disclosure. The example system 700 illustrated in FIG. 7 is provided as an example only. The components, systems, connections, and/or other aspects illustrated in FIG. 700 are optional and are provided as examples of what is possible, but not required, to implement the present disclosure. The example system 700 can include an application computing system 1305 (e.g., that is associated with a service entity, computing system 301 etc.). The example system 700 can include an analytics computing system 1310 (e.g., that is associated with a remote computing system 402 for analyzing data logs from a caller propagation service 302, etc.). The example system 700 can include a user device 1315 (e.g., user device of the user, etc.). One or more of the application computing system 1305, the analytics computing system 1310, or the user device 1315 can be communicatively coupled to one another over one or more communication network(s) 1317. The networks 1317 can correspond to any of the networks described herein.

The computing device(s) 1320 of the application computing system 1305 can include processor(s) 1325 and a memory 1330. The one or more processors 1325 can be any suitable processing device (e.g., a processor core, a microprocessor, an ASIC, a FPGA, a controller, a microcontroller, etc.) and can be one processor or a plurality of processors that are operatively connected. The memory 1330 can include one or more non-transitory computer-readable storage media, such as RAM, ROM, EEPROM, EPROM, one or more memory devices, flash memory devices, data registrar, etc., and combinations thereof.

The memory 1330 can store information that can be accessed by the one or more processors 1325. For example, the memory 1330 (e.g., one or more non-transitory computer-readable storage mediums, memory devices, etc.) can include computer-readable instructions 1330A that can be executed by the one or more processors 1325. The instructions 1330A can be software written in any suitable programming language or can be implemented in hardware. Additionally, or alternatively, the instructions 1330A can be executed in logically and/or virtually separate threads on processor(s) 1325.

For example, the memory 1330 can store instructions 1330A that when executed by the one or more processors 1325 cause the one or more processors 1325 (e.g., of the application computing system 1305, etc.) to perform operations such as any of the operations and functions of the computing system(s) (e.g., operations computing system, etc.) described herein (or for which the system(s) are configured), one or more of the operations and functions for communicating between the computing systems, one or more portions/operations of method 600, and/or one or more of the other operations and functions of the computing systems described herein.

The memory 1330 can store data 1330B that can be obtained (e.g., acquired, received, retrieved, accessed, created, stored, etc.). The data 1330B can include, for example, any of the data/information described herein. In some implementations, the computing device(s) 1320 can obtain data from one or more memories that are remote from the application computing system 1305.

The computing device(s) 1320 can also include a communication interface 1335 used to communicate with one or more other system(s) remote from the application computing system 1305, such as the analytics computing system 1310, and/or user device 1315. The communication interface 1335 can include any circuits, components, software, etc. for communicating via one or more networks (e.g., network(s) 1317, etc.). The communication interface 1335 can include, for example, one or more of a communications controller, receiver, transceiver, transmitter, port, conductors, software and/or hardware for communicating data.

The analytics computing system 1310 can include one or more computing device(s) 1340 that are remote from the application computing system 1305, and the user device 1315. The computing device(s) 1340 can include one or more processors 1345 and a memory 1350. The one or more processors 1345 can be any suitable processing device (e.g., a processor core, a microprocessor, an ASIC, a FPGA, a controller, a microcontroller, etc.) and can be one processor or a plurality of processors that are operatively connected. The memory 1350 can include one or more tangible, non-transitory computer-readable storage media, such as RAM, ROM, EEPROM, EPROM, one or more memory devices, flash memory devices, data registrar, etc., and combinations thereof.

The memory 1350 can store information that can be accessed by the one or more processors 1345. For example, the memory 1350 (e.g., one or more tangible, non-transitory computer-readable storage media, one or more memory devices, etc.) can include computer-readable instructions 1350A that can be executed by the one or more processors 1345. The instructions 1350A can be software written in any suitable programming language or can be implemented in hardware. Additionally, or alternatively, the instructions 1350A can be executed in logically and/or virtually separate threads on processor(s) 1345.

For example, the memory 1350 can store instructions 1350A that when executed by the one or more processors 1345 cause the one or more processors 1345 to perform operations such as any of the operations and functions of the computing system(s) (e.g., advertisement server, etc.) described herein (or for which the system(s) are configured), one or more of the operations and functions for communicating between computing systems, one or more portions/operations of method 600 and/or one or more of the other operations and functions of the computing systems described herein. The memory 1350 can store data 1350B that can be obtained. The data 1350B can include, for example, any of the data/information described herein.

The computing device(s) 1340 can also include a communication interface 1360 used to communicate with one or more system(s) that are remote from the system 1310. The communication interface 1360 can include any circuits, components, software, etc. for communicating via one or more networks (e.g., network(s) 1317, etc.). The communication interface 1360 can include, for example, one or more of a communications controller, receiver, transceiver, transmitter, port, conductors, software and/or hardware for communicating data.

The analytics computing system 1310 can include a display output 1399. The display output 1399 can be any type of display including, for example, a cartop display device, liquid crystal display (LCD), liquid emitting diode display (LED), organic light emitting diode (OLED), plasma monitor, cathode ray tube (CRT), display screen, monitor, television, or any other suitable display device.

The user device 1315 can include one or more computing device(s) 1365 that are remote from the application computing system 1305, and the analytics computing system 1310. The computing device(s) 1365 can include one or more processors 1367 and a memory 1370. The one or more processors 1370 can be any suitable processing device (e.g., a processor core, a microprocessor, an ASIC, a FPGA, a controller, a microcontroller, etc.) and can be one processor or a plurality of processors that are operatively connected. The memory 1370 can include one or more tangible, non-transitory computer-readable storage media, such as RAM, ROM, EEPROM, EPROM, one or more memory devices, flash memory devices, data registrar, etc., and combinations thereof.

The memory 1370 can store information that can be accessed by the one or more processors 1367. For example, the memory 1370 (e.g., one or more tangible, non-transitory computer-readable storage media, one or more memory devices, etc.) can include computer-readable instructions 1370A that can be executed by the one or more processors 1367. The instructions 1370A can be software written in any suitable programming language or can be implemented in hardware. Additionally, or alternatively, the instructions 1370A can be executed in logically and/or virtually separate threads on processor(s) 1367.

For example, the memory 1370 can store instructions 1370A that when executed by the one or more processors 1367 cause the one or more processors 1367 to perform operations such as any of the operations and functions of the computing system(s) (e.g., user devices, etc.) described herein (or for which the user device(s) are configured), one or more of the operations and functions for communicating between systems, one or more portions/operations of method 600 and/or one or more of the other operations and functions of the computing systems described herein. The memory 1370 can store data 1370B that can be obtained. The data 1370B can include, for example, any of the data/information described herein.

The computing device(s) 1365 can also include a communication interface 1375 used to communicate computing device/system that is remote from the user device 1315, such as analytics computing system 1310 or application computing system 1305. The communication interface 1375 can include any circuits, components, software, etc. for communicating via one or more networks (e.g., network(s) 1317, etc.). The communication interface 1375 can include, for example, one or more of a communications controller, receiver, transceiver, transmitter, port, conductors, software and/or hardware for communicating data.

The network(s) 1317 can be any type of network or combination of networks that allows for communication between devices. In some implementations, the network(s) 1317 can include one or more of a local area network, wide area network, the Internet, secure network, cellular network, mesh network, peer-to-peer communication link and/or some combination thereof and can include any number of wired or wireless links. Communication over the network(s) 1317 can be accomplished, for example, via a communication interface using any type of protocol, protection scheme, encoding, format, packaging, etc.

Computing tasks discussed herein as being performed at certain computing device(s)/systems may instead be performed at another computing device/system, or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein may be adapted, rearranged, expanded, omitted, combined, or modified in various ways without deviating from the scope of the present disclosure. Some implementations are described with a reference numeral, for example illustrated purposes and are not meant to be limiting.

What is claimed is:

1. A computing system comprising:

one or more processors; and one or more memory resources storing instructions executable by the one or more processors to perform operations, the operations comprising:

executing a software application associated with a plurality of nodes;

receiving, by a first node of the plurality of nodes, a first request over a network;

generating, by a first propagation agent associated with the first node, a first bit encoding indicative of the first node, wherein the first bit encoding is associated with a fixed size:

transmitting, by the first node, a second request over the network to a second node of the plurality of nodes, wherein the second request is associated with the first request;

generating, by a second propagation agent associated with the second node and based on the first bit encoding, a second bit encoding indicative of the first node and the second node, wherein the second bit encoding updates at least one value of the first bit encoding and maintains the fixed size; and determining, based on the second bit encoding, a sequence of requests indicative of a calling node, a receiving node, and caller path over the network.

2. The computing system of claim 1, wherein the first node is associated with a first microservice and the second node is associated with a second microservice.

3. The computing system of claim 1, wherein the operations comprise:

generating, based on the sequence of requests, a request chain, the request chain indicative of a transmission of requests across a plurality of nodes.

4. The computing system of claim 3, wherein the operations further comprise updating the request chain, based on generating subsequent bit encodings.

5. The computing system of claim 3, wherein the operations comprise:

generating, based on the request chain, log data, wherein the log data describes a relationship between one or more nodes; and transmitting the log data to a storage system, the storage system storing a plurality of log data associated with one or more request chains.

6. The computing system of claim 5, wherein the log data comprises at least one of: (i) an error rate metric, (ii) a latency metric, or (iii) a request rate metric.

7. The computing system of claim 5, wherein the operations comprise outputting one or more command instructions to generate a user interface to display a caller mapping, the caller mapping indicative of the sequence of requests across a plurality of nodes.

8. The computing system of claim 5, wherein the operations comprise:

decoding the request chain, the request chain comprising the first bit encoding and the second bit encoding.

9. The computing system of claim 1, wherein the first bit encoding and the second bit encoding are generated using an algorithm.

10. The computing system of claim 1, wherein the fixed size is associated with a hash value.

11. A computer-implemented method comprising:

executing a software application associated with a plurality of nodes;

receiving by a first node of the plurality of nodes, a first request over a network;

generating, by a first propagation agent associated with the first node, a first bit encoding indicative of the first node, wherein the first bit encoding is associated with a fixed size;

transmitting, by the first node, a second request over the network to a second node of the plurality of nodes, wherein the second request is associated with the first request;

generating, by a second propagation agent associated with the second node and based on the first bit encoding, a second bit encoding indicative of the first node and the second node, wherein the second bit encoding updates at least one value of the first bit encoding and maintains the fixed size; and determining, based on the second bit encoding, a sequence of requests indicative of a calling node, a receiving node, and caller path over the network.

12. The computer-implemented method of claim 11, wherein the first node is associated with a first microservice and the second node is associated with a second microservice.

13. The computer-implemented method of claim 11 comprising:

generating, based on the sequence of requests, a request chain, the request chain indicative of a transmission of requests across a plurality of nodes.

14. The computer-implemented method of claim 13, comprising updating the request chain, based on generating subsequent bit encodings.

15. The computer-implemented method of claim 13, comprising:

generating, based on the request chain, log data, wherein the log data describes a relationship between one or more nodes; and transmitting the log data to a storage system, the storage system storing a plurality of log data associated with one or more request chains.

16. The computer-implemented method of claim 15, wherein the log data comprises at least one of: (i) an error rate metric, (ii) a latency metric, or (iii) a request rate metric.

17. The computer-implemented method of claim 15, comprising outputting one or more command instructions to generate a user interface to display a caller mapping, the caller mapping indicative of the sequence of requests across a plurality of nodes.

18. The computer-implemented method of claim 11 comprising:

decoding the request chain, the request chain comprising the first bit encoding and the second bit encoding.

19. The computer-implemented method of claim 11, wherein the first bit encoding and the second bit encoding are generated using an algorithm, the algorithm configured to generate fixed-size bit encodings.

20. A non-transitory computer-readable media storing instructions that are executable by one or more processors to cause the one or more processors to perform operations, the operations comprising:

executing a software application associated with a plurality of nodes;

receiving, by a first node of the plurality of nodes, a first request over a network;

generating, by a first propagation agent associated with the first node. a first bit encoding indicative of the first node, wherein the first bit encoding is associated with a fixed size;

transmitting, by the first node, a second request over the network to a second node of the plurality of nodes, wherein the second request is associated with the first request;

generating, by a second propagation agent associated with the second node and based on the first bit encoding, a second bit encoding indicative of the first node and the second node, wherein the second bit encoding updates at least one value of the first bit encoding and maintains the fixed size; and determining, based on the second bit encoding, a sequence of requests indicative of a calling node, a receiving node, and caller path over the network.

* * * * *